United States Patent
Bae et al.

(10) Patent No.: US 9,423,542 B2
(45) Date of Patent: Aug. 23, 2016

(54) POLARIZER, METHOD FOR PREPARING THE SAME, AND POLARIZING PLATE PROVIDED WITH THE SAME

(75) Inventors: Chang Seok Bae, Uiwang-si (KR); Han Soo Park, Uiwang-si (KR); In Seok Oh, Uiwang-si (KR); Hae Ryong Chung, Uiwang-si (KR)

(73) Assignee: CHEIL INDUSTRIES, INC., Gumi-si, Gyeongsangbuk-do (KR)

( * ) Notice: Subject to any disclaimer, the term of this patent is extended or adjusted under 35 U.S.C. 154(b) by 221 days.

(21) Appl. No.: 12/981,153

(22) Filed: Dec. 29, 2010

(65) Prior Publication Data
US 2011/0163281 A1    Jul. 7, 2011

(30) Foreign Application Priority Data

Dec. 31, 2009   (KR) .................. 10-2009-0135676

(51) Int. Cl.
| | | |
|---|---|---|
| *F21V 9/14* | (2006.01) | |
| *G02B 5/30* | (2006.01) | |
| *G02C 7/12* | (2006.01) | |
| *B29D 11/00* | (2006.01) | |
| *G02F 1/1335* | (2006.01) | |

(52) U.S. Cl.
CPC ....... *G02B 5/3083* (2013.01); *B29D 11/00644* (2013.01); *B29D 11/00894* (2013.01); *G02F 1/133528* (2013.01)

(58) Field of Classification Search
USPC ....... 252/585; 359/500, 483.01, 492.01, 485, 359/489.02, 491; 8/489; 156/60.99, 60; 349/96, 119, 117, 124, 99; 428/323, 428/355 N, 411.1, 1.1, 1.3, 1.31, 447; 264/1.34; 427/162
See application file for complete search history.

(56) References Cited

U.S. PATENT DOCUMENTS

2004/0052937 A1 * 3/2004 Ito et al. ................. 427/162
2009/0290215 A1   11/2009 Kwon et al.
2010/0309414 A1 * 12/2010 Tomonaga et al. ........ 349/96

FOREIGN PATENT DOCUMENTS

| CN | 101004464 A |   | 7/2007 | |
|---|---|---|---|---|
| CN | 101004464 A | * | 7/2007 | ............... G02B 5/30 |
| JP | 2009-063829 | * | 3/2009 | ............... G02B 5/30 |
| TW | 200931081 |   | 7/2009 | |
| WO | WO 2009/072391 A1 |   | 6/2009 | |

OTHER PUBLICATIONS

Taiwanese Office Action in TW 099146914, dated May 12, 2013, with English translation (Bae, et al.).
Chinese Office Action dated May 19, 2014.
Provisional double patenting rejection of claims; USPTO Office Action mailed Sep. 12, 2014, in U.S. Appl. No. 13/337,627.

* cited by examiner

*Primary Examiner* — Bijan Ahvazi
(74) *Attorney, Agent, or Firm* — Lee & Morse, P.C.

(57) ABSTRACT

A polarizer includes a polyvinyl alcohol-based resin film in which iodine is oriented by adsorption, wherein an iodine orientation ratio, represented by the following Equation I, is about 20% to about 30%, $$\text{Iodine orientation ratio} = \frac{R_I}{R_{PVA}}, \quad \text{(I)}$$

$R_I$ being an average in-plane retardation value of iodine in infrared regions of 845.1 nm, 903.3 nm, 952.1 nm, 1000.0 nm, 1046.5 nm, and 1092.7 nm, and $R_{PVA}$ being an average in-plane retardation value of a polyvinyl alcohol-based resin in infrared regions of 845.1 nm, 903.3 nm, 952.1 nm, 1000.0 nm, 1046.5 nm, and 1092.7 nm.

9 Claims, No Drawings

POLARIZER, METHOD FOR PREPARING THE SAME, AND POLARIZING PLATE PROVIDED WITH THE SAME

BACKGROUND

1. Field

Embodiments relate to a polarizer, a method for preparing the same, and a polarizing plate provided with the same.

2. Description of the Related Art

A liquid crystal display (LCD) is one of the most general flat panel displays. The liquid crystal display includes a liquid crystal panel (including two display plates provided with an electric field-forming electrode and a liquid crystal layer sealed therebetween). The liquid crystal display generates a certain potential difference across the liquid crystal layer when voltage is applied to the electric field-forming electrode, determines orientation of liquid crystal molecules of the liquid crystal layer, and controls polarization of incident light, thereby displaying an image.

SUMMARY

An embodiment is directed to a polarizer, including a polyvinyl alcohol-based resin film in which iodine is oriented by adsorption, wherein an iodine orientation ratio, represented by the following Equation I, is about 20% to about 30%, $$\text{Iodine orientation ratio} = \frac{R_I}{R_{PVA}}, \quad (I)$$

$R_I$ being an average in-plane retardation value of iodine in infrared regions of 845.1 nm, 903.3 nm, 952.1 nm, 1000.0 nm, 1046.5 nm, and 1092.7 nm, and $R_{PVA}$ being an average in-plane retardation value of a polyvinyl alcohol-based resin in infrared regions of 845.1 nm, 903.3 nm, 952.1 nm, 1000.0 nm, 1046.5 nm, and 1092.7 nm.

The polarizer may have a boric acid content of about 10% to about 20%.

The polarizer may have a display uniformity of about 0.03 cd to about 0.1 cd.

Another embodiment is directed to a method for preparing a polarizer, the method including dyeing a polyvinyl alcohol-based resin film with an iodine-containing dyeing solution, cross-linking the dyed film in a drawing ratio of about 1.0 to about 1.5, and drawing the cross-linked film in a drawing bath containing about 1% to about 3% boric acid. The total drawing ratio may be about 5.8 to about 6.5.

The dyeing solution may have a temperature of about 20° C. to about 40° C.

The drawing bath may have a temperature of about 40° C. to about 62° C.

Another embodiment is directed to a polarizing plate including a polarizer according to an embodiment.

The polarizing plate may have a structure in which a protective film is provided on at least one surface of the polarizer.

The protective film may have an in-plane retardation value ($R_o$), represented by the following Equation II, of about 40 nm to about 60 nm:

$$Ro = (n_x - n_y) \times d \quad (II),$$

$n_x$ being a film in-plane maximum refractive index, $n_y$ being a refractive index in one direction perpendicular to $n_x$, and d being a film thickness (nm).

DETAILED DESCRIPTION

Korean Patent Application No. 10-2009-0135676, filed on Dec. 31, 2009, in the Korean Intellectual Property Office, and entitled: "Polarizer, Method for Preparing the Same and Polarizing Plate Provided With the Same," is incorporated by reference herein in its entirety.

Example embodiments will now be described more fully hereinafter; however, they may be embodied in different forms and should not be construed as limited to the embodiments set forth herein. Rather, these embodiments are provided so that this disclosure will be thorough and complete, and will fully convey the scope of the invention to those skilled in the art.

It will be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

A polarizer according to an example embodiment includes a polyvinyl alcohol-based resin film in which iodine is oriented by adsorption, wherein an iodine orientation ratio represented by the following Equation I is about 20% to about 30%, preferably about 24 to about 28%.

$$\text{Iodine orientation ratio} = \frac{R_I}{R_{PVA}} \quad (I)$$

In Equation I, $R_I$ is an average in-plane retardation value of iodine in infrared regions of 845.1 nm, 903.3 nm, 952.1 nm, 1000.0 nm, 1046.5 nm, and 1092.7 nm, and $R_{PVA}$ is an average in-plane retardation value of a polyvinyl alcohol-based resin (PVA-based resin) in infrared regions of 845.1 nm, 903.3 nm, 952.1 nm, 1000.0 nm, 1046.5 nm, and 1092.7 nm.

Herein, the in-plane retardation value ($R_o$) may be defined by the following Equation II:

$$Ro = (n_x - n_y) \times d \quad (II)$$

In Equation II, $n_x$ is a film in-plane maximum refractive index, $n_y$ is refractive index in one direction perpendicular to $n_x$, and d is a film thickness (nm).

According to an embodiment, the iodine orientation ratio of the polarizer is about 20% to about 30%. Within this range, superior display uniformity may be achieved.

In an embodiment, the polarizer contains boric acid in an amount of about 10% to about 20%, preferably about 13% to about 17%. Within this range, breakage during drawing of the polarizer may be prevented and superior display uniformity may be achieved.

In an embodiment, the polarizer may have display uniformity of about 0.03 cd to about 0.1 cd. This display uniformity may be determined from the difference of brightness measured at respective positions using a brightness meter.

Embodiments are also directed to a method for preparing the polarizer. In an embodiment, the method includes: dyeing a polyvinyl alcohol-based resin film with an iodine-containing dyeing solution; cross-linking the dyed film in a drawing ratio of about 1.0 to about 1.5; and drawing the cross-linked film in a drawing bath containing about 1% to about 3% boric acid.

In an embodiment, the polyvinyl alcohol-based resin film may be swollen prior to dyeing with iodine. The swelling process may be carried out in a swelling bath at about 22° C. to about 28° C. The swelling process may remove foreign materials from the surface of a film and/or facilitate drying. The swelling bath may contain water, chloride, boric acid, inorganic acid, an organic solvent, or the like. The manufacture and selection of the swelling bath may be readily performed by those skilled in the art.

The swollen polyvinyl alcohol-based resin film may be dyed with a dyeing solution that includes iodine and potassium iodide. In an implementation, the dyeing solution may consist of iodine and potassium iodide in water. In an embodiment, the iodine dyeing bath may contain about 0.05 parts by weight to about 0.2 parts by weight of iodine and about 0.5 parts by weight to about 2.5 parts by weight of potassium iodide, with respect to about 100 parts by weight of water. Within this range, the desired iodine orientation ratio may be obtained.

Iodine dyeing may be carried out at a temperature of about 20° C. to about 40° C. for about 2 to about 4 minutes.

The dyed polyvinyl alcohol-based resin film may be subjected to a drawing process. The drawing may be carried out by a suitable method. In an embodiment, the film may be subjected to drawing in a drawing ratio of about 2.5 to about 4.0. In an embodiment, the drawing may be performed in a drawing bath containing about 1% to about 3% boric acid and preferably about 2% to about 2.7% boric acid. The drawing bath may have a temperature of about 40° C. to about 62° C.

In addition, the drawing may be carried out during dyeing and cross-linking processes as well as after dyeing with iodine. In all cases, the total drawing ratio may be adjusted to about 5.8 to about 6.5. The cross-linking process is carried out in a cross-linking bath containing boric acid. The concentration of boric acid in the cross-linking bath is about 1% to about 5% by weight, preferably about 2.5% to about 4% by weight, more preferably about 2.8% to about 3.5% by weight. Within this range, the desired content of boric acid may be obtained. In an implementation, the dyed film is subjected to cross-linking and at the same time drawn in a drawing ratio of about 1.0 to about 1.5.

In an embodiment, the cross-linking bath has a temperature of about 30° C. to about 50° C. and the cross-linking is carried out for about 1 minute to about 2 minutes.

The cross-linked film may again be subjected to drawing in a drawing ratio of about 2.5 to about 4.0.

In an embodiment, the total drawing ratio ranges from about 5.8 to about 6.5. The desired iodine orientation ratio and boric acid may be obtained within this range. For example, the total drawing ratio may be adjusted to about 5.8, 5.9, 6.0, 6.1, 6.2, 6.3, 6.4, or 6.5.

The polarizer prepared as described above may have a thickness of about 0.5 µm to about 400 µm, preferably about 5 µm to about 200 µm.

Embodiments are also directed to a polarizing plate including the polarizer. In an embodiment, the polarizing plate has a structure in which a protective film is formed on at least one surface of the polarizer. The protective film may serve as a retardation film, brightness-improving film, reflective film, semi-permeable reflective film, diffusion film, optical compensation film, or the like, and such a film may be further laminated on the protective film. In an embodiment, the protective film may have an in-plane retardation value (Ro) of about 40 nm to about 60 nm, preferably about 50 nm to about 60 nm.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Features and procedures whose implementations are well known to those skilled in the art may be omitted for brevity.

EXAMPLES

Example 1

(Swelling) A polyvinyl alcohol film with a thickness of 75 µm (VF-PE®, polymerization degree: 2400) was immersed in water at 27° C. for 4 minutes and sufficiently swollen.

(Dyeing) Then, the film was immersed in an aqueous solution containing 0.08 parts by weight of iodine, 0.2 parts by weight of potassium iodide, and 100 parts by weight of water, and drawn in one axis to a drawing ratio of 1.24.

(Cross-linking) Then, the film was subjected to cross-linking in a 35° C. cross-linking bath containing 3 parts by weight of boric acid and 100 parts by weight of water, and, at the same time, drawn in one axis to a drawing ratio of 1.2.

(Drawing) Then, the film was drawn in one axis to a drawing ratio of 3.5 in a 55° C. drawing bath containing 2.5 parts by weight of boric acid and 100 parts by weight of water.

Then, the film was washed with water at 17° C. for 5 seconds, immersed in a complementary bath containing 1 part by weight of boric acid, 5 parts by weight of potassium iodide, and 100 parts by weight of water, and dried at a temperature of 50° C. for 2 minutes to obtain a polarizer.

For the polarizer thus obtained, in-plane retardation values of iodine and polyvinyl alcohol-based resins were measured at 845.1 nm, 903.3 nm, 952.1 nm, 1000.0 nm, 1046.5 nm, and 1092 nm using a KOBRA-IR apparatus and an iodine orientation ratio was obtained therefrom.

In addition, the content of boric acid in the polarizer was determined through titration, and display uniformity was evaluated with the difference of brightness at respective positions measured using a brightness meter.

Example 2

The same process as in Example 1 was performed, except that the drawing in the drawing bath was carried out to a drawing ratio of 3.0.

Example 3

The same process as in Example 1 was performed, except that the concentration of boric acid in the drawing bath was 2.8 parts by weight.

Example 4

The same process as in Example 1 was performed, except that the drawing in the drawing bath was carried out to a drawing ratio of 3.0 under the condition that the concentration of boric acid in the drawing bath was 2.8 parts by weight.

Comparative Example 1

The same process as in Example 1 was performed, except that the concentration of boric acid in the drawing bath was 3.5 parts by weight.

Comparative Example 2

The same process as in Example 1 was performed, except that the drawing in the drawing bath was carried out to a drawing ratio of 3.0 under the condition that the concentration of boric acid in the drawing bath was 3.5 parts by weight.

The results of Examples 1 to 4 and Comparative Examples 1 to 2 are shown in Table 1 below:

TABLE 1

| | Iodine orientation ratio | Content of boric acid | Display uniformity (cd) |
|---|---|---|---|
| Ex. 1 | 24.5% | 17.3% | 0.0517 |
| Ex. 2 | 23.9% | 17.7% | 0.0768 |
| Ex. 3 | 24.3% | 17.9% | 0.0933 |
| Ex. 4 | 23.2% | 17.6% | 0.0852 |
| Comp. Ex. 1 | 17.1% | 21.3% | 0.2701 |
| Comp. Ex. 2 | 17.5% | 22.1% | 0.3365 |

As described above, embodiments relate to a polarizer and a method for preparing the same. The iodine orientation ratio and the amount of boric acid contained in the polarizer may be defined to a specific range to improve the polarization level of the polarizer and display qualities.

A polarizing plate may be provided outside of the liquid crystal panel. The polarizing plate may selectively transmit light directed in a specific direction among light incident from a backlight and light passing through the liquid crystal layer to control polarization.

The polarizing plate may include a polarizer polarizing light in a specific direction, and a protective layer to support and protect the polarizer. A high polarization level of the polarizer is desirable to improve display qualities of the polarizing plate for LCD panels. Generally, a polarizer may be prepared by dyeing a PVA film with dichroic iodine and cross-linking the PVA film with boric acid or borax. Polarizers developed to date focus on permeability and polarization level. However, attention should be directed to the effects of iodine orientation ratio on the polarization level.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A polarizer, comprising:
   a polyvinyl alcohol-based resin film in which iodine is oriented by adsorption, wherein an iodine orientation ratio, represented by the following Equation I, is about 0.20 to about 0.30, $$\text{Iodine orientation ratio} = \frac{R_I}{R_{PVA}}, \qquad (I)$$

$R_I$ being an average of in-plane retardation values of iodine in infrared regions of 845.1 nm, 903.3 nm, 952.1 nm, 1000.0 nm, 1046.5 nm, and 1092.7 nm, and $R_{PVA}$ being an average of in-plane retardation values of a polyvinyl alcohol-based resin in infrared regions of 845.1 nm, 903.3 nm, 952.1 nm, 1000.0 nm, 1046.5 nm, and 1092.7 nm.

2. The polarizer according to claim 1, wherein said polarizer has a boric acid content of about 10% to about 20%.

3. The polarizer according to claim 2, wherein said polarizer has a display uniformity of about 0.03 cd to about 0.1 cd.

4. A method for preparing a polarizer, the method comprising:
   dyeing a polyvinyl alcohol-based resin film with an iodine-containing dyeing solution according to claim 1;
   cross-linking the dyed film in a drawing ratio of about 1.0 to about 1.5; and
   drawing the cross-linked film in a drawing bath containing about 1% to about 3% boric acid,
   wherein the total drawing ratio is about 5.8 to about 6.5.

5. The method as claimed in claim 4, wherein said dyeing solution has a temperature of about 20° C. to about 40° C.

6. The method as claimed in claim 4, wherein said drawing bath has a temperature of about 40° C. to about 62° C.

7. A polarizing plate comprising the polarizer according to claim 1.

8. The polarizing plate according to claim 7, wherein said polarizing plate has a structure in which a protective film is provided on at least one surface of the polarizer.

9. The polarizing plate according to claim 8, wherein said protective film has an in-plane retardation value ($R_o$), represented by the following Equation II, of about 40 nm to about 60 nm:

$$Ro = (n_x - n_y) \times d \qquad (II),$$

$n_x$ being a film in-plane maximum refractive index, $n_y$ being a refractive index in one direction perpendicular to $n_x$, and d being a film thickness (nm).

* * * * *